United States Patent [19]

Fumio et al.

[11] Patent Number: 4,829,032

[45] Date of Patent: May 9, 1989

[54] DIELECTRIC CERAMIC COMPOSITION

[75] Inventors: Mizuno Fumio; Ito Kenji, both of Nagoya, Japan

[73] Assignee: NGK Spark Plug Co., Ltd., Japan

[21] Appl. No.: 6,462

[22] Filed: Jan. 16, 1987

[30] Foreign Application Priority Data

Jan. 16, 1986 [JP] Japan .................................. 61-8687
Jan. 16, 1986 [JP] Japan .................................. 61-8689

[51] Int. Cl.$^4$ .............................................. C04B 35/46
[52] U.S. Cl. ..................................... 501/137; 501/134; 501/135; 501/136; 501/138
[58] Field of Search ............... 501/134, 135, 136, 137, 501/138, 139

[56] References Cited

U.S. PATENT DOCUMENTS

| | | | |
|---|---|---|---|
| Re. 29,484 | 11/1977 | Utsumi et al. ........................ | 501/138 |
| 3,464,785 | 9/1969 | Galasso ................................ | 501/137 |
| 4,468,472 | 8/1984 | Kashima et al. ..................... | 501/137 |
| 4,550,089 | 10/1985 | Ayusawa et al. .................... | 501/139 |
| 4,699,891 | 10/1987 | Sato et al. ........................... | 501/137 |

FOREIGN PATENT DOCUMENTS 0460764 11/1949 Canada .................................. 501/137
50-058599 5/1975 Japan .................................... 501/137

OTHER PUBLICATIONS

O'Bryan, Jr. et al., "A New BaO–TiO$_2$ Compound with Temperature Stable High Permittivity and Low Microwave Loss," Journal of the American Ceramic Society, vol. 57, No. 10, pp. 450–453, Oct. 1974.

*Primary Examiner*—William R. Dixon, Jr.
*Assistant Examiner*—Anthony J. Green
*Attorney, Agent, or Firm*—Darby & Darby

[57] ABSTRACT

A dielectric ceramic composition suitable for use in microwave regions including a mixture of 15–25 mol % of BaO and 85–75 mol % of TiO$_2$, and Ba(Ni$_{1/3}$Ta$_{2/3}$)O$_3$ in an amount of less than 0.2% based on the weight of the mixture. The ceramic composition may further include one or more metal oxides selected from La$_2$O$_3$, Sb$_2$O$_3$, Fe$_2$O$_3$ and Ta$_2$O$_5$ in an amount of 0.1–1.2% based on the weight of said mixture.

4 Claims, No Drawings

4,829,032

DIELECTRIC CERAMIC COMPOSITION

BACKGROUND OF THE INVENTION

1. Field of the Invention:

This invention relates generally to a dielectric ceramic composition and, more particularly, to a dielectric ceramic composition useful for use in microfrequency regions.

2. Description of the Prior Art:

With recent development of communication networks, the frequency of radiowaves utilized is extended to cover the microwave regions. In connection with this, dielectric ceramics are finding their applications in dielectric resonators, microwave integrated circuit substrates and impedance matching of various microwave circuits. Especially, there is an increasing demand for dielectric ceraics suitable for use in frequency stabilization of filters, gus and FET microwave oscillators.

Known dielectric ceramic materials for use in high frequency regions include $ZnO_2$-$SnO_2$-$TiO_2$ ceramics, $BaO$-$TiO_2$ ceramics and their derivatives modified with other metal oxide or oxides. The known ceramic materials, however, are not entirely satisfactory, because of their low unloaded Q values, low specific dielectric constant or incapability of providing desired temperature characteristics.

SUMMARY OF THE INVENTION

It is, therefore, an object of the present invention to provide a dielectric ceramic composition which is devoid of the drawbacks of the conventional dielectric ceramic materials and which is suitable for use in high frequency regions.

It is a special object of the present invention to provide a dielectric ceramic composition which has a high Q value, practically acceptable dielectric constant and stable temperature characteristics and which is especially advantageously used in microwave regions.

In accomplishing the foregoing objects, there is provided in accordance with the present invention a dielectric ceramic composition comprising a mixture of 15–25 mol % of BaO and 85–75 mol % of $TiO_2$, and $Ba(Ni_{\frac{1}{3}}Ta_{\frac{2}{3}})O_3$ in an amount of less than 0.2% based on the weight of the mixture.

The above composition may further include at least one metal oxide selected from the group consisting of $La_2O_3$, $Sb_2O_3$, $Fe_2O_3$ and $Ta_2O_5$ in an amount of 0.1–1.2% based on the weight of the mixture.

Other objects, features and advantages of the present invention will become apparent from the detailed description of the invention to follow.

DETAILED DESCRIPTION OF THE INVENTION

The dielectric ceramic composition of the present invention includes a mixture of 15–25 mol %, preferably 17–22 mol % of BaO and 85–75 mol%, preferably 83–78 mol % of $TiO_2$. At least 15 mol % of BaO is required for obtaining a ceramic composition with a high Q value. On the other hand, too large an amount of BaO in excess of 25 mol % causes a decrease in Q value.

To the mixture of BaO and $TiO_2$ is incorporated less than 0.2%, preferably 0.01–0.19% by weight of $Ba(Ni_{\frac{1}{3}}Ta_{\frac{2}{3}})O_3$, which is a solid solution of a perovskite structure.

Preferably, the above ceraic composition of the present invention further includes one or more metal oxide selected from $La_2O_3$, $Sb_2O_3$, $Fe_2O_3$ and $Ta_2O_5$ in an amount of 0.1–1.2% based on the weight of the mixture of BaO and $TiO_2$. The use of such a metal oxide can further improve the Q value of the ceramic composition. At least 0.1% by weight is necessary to obtain such a synergetic effect. When the amount of the metal oxide or oxides becomes 1.2% by weight or more, however, the Q value of resulting ceramic composition becomes lowered.

If desired, the ceramic composition of the present invention may further include $MnO_2$ in an amount of 0.4% by weight based on the weight of the mixture of BaO and $TiO_2$ for the purpose of improving the degree of sintering. Whilst $MnO_2$ does not serve to improve the Q value, too large an amount thereof over 0.4% by weight can adversely affect the Q value of the ceramic composition.

Dielectric ceramic materials may be prepared from the above composition in any known manner. The ceramic composition according to the present invention has a significantly improved Q value, especially 4000 or more, and prac;tically acceptable dielectric constant $\epsilon$ and resonant frequency temperature coefficient $\tau_f$ and, hence, is advantageously applied to dielectric ceramic materials used in microwave regions.

The following examples will further illustrate the present invention.

EXAMPLE 1

Necessary quantities of $BaCO_3$, $TiO_2$, $Ba(Ni_{\frac{1}{3}}Ta_{\frac{2}{3}})O_3$ and $MnO_2$ were weighed and mixed with each other with a mixer in a dry state. The mixture was then calcined at 1000° C. in air for 6 hours. The resulting calcined product was mixed with a suitable amount of an organic binder and water and finely ground with a ball mill using alumina balls of 30 mm diameter. The resultant mixture was spray-dried. The thus obtained particles were then shaped into tablets having a diameter of 15 mm and the thickness of 10 mm by means of a press machine. The compression-molded tablets were then sintered at 1300°–1420° C. for 10 hours in air, followed by polishing to obtain discs with a diameter of 9 mm and a thickness of 5 mm. Silver electrodes were then provided on both sides of a sample disc to obtain 10 kinds of dielectric samples Nos. 1–10 whose compositions are summarized in Table 1.

EXAMPLE 2

Necessary quantities of $BaCO_3$, $TiO_2$, $Ba(Ni_{\frac{1}{3}}Ta_{\frac{2}{3}})O_3$ and $MnO_2$ were weighed and mixed with each other with a mixer in a dry state. The mixture was then calcined at 1000° C. in air for 6 hours. The calcined mass was then mixed, in the dry state, with $La_2O_3$, $Sb_2O_3$, $Fe_2O_3$ or $Ta_2O_5$ using the mixer, followed by recalcination at 1000° C. in air for 6 hours. Then, the resulting calcined product was ground with a ball mill, spray-dried, subjected to compression-molding, sintered, polished and provided with silver electrodes in the same manner as described in Example 1, thereby to obtain dielectric ceramic samples Nos. 11–41 having the composition shown in Table 1.

The thus obtained samples Nos. 1–41 were tested for Q values ($=1/\tan\delta$), dielectric constant $\epsilon$ and resonant frequency temperature coefficient $\tau_f$. The results were as summarized in Table 1. The dielectric constant $\epsilon$ and Q value were measured by a dielectric resonator method while the temperature coefficient $\tau_f$ was measured in the temperature range of from −30° C. to +80° C. and calculated on the basis of the following equation:

$$\tau_f = -\tfrac{1}{2}\tau_\epsilon - \alpha$$

where $\tau_\epsilon$ represents the temperature coefficient of dielectric constant and $\alpha$ represents the coefficient of linear expansion of the ceramic sample. The resonance frequency used was 6.9 GHz.

TABLE 1

| Sample No. | BaO | TiO$_2$ | X** | Y*** | MnO$_2$ | $\epsilon$ | Q | $\tau$ (ppm/°C.) |
|---|---|---|---|---|---|---|---|---|
| 1 | 18.2 | 81.8 | 0.05 | 0 | 0.1 | 38.3 | 4750 | +4.5 |
| 2 | 18.2 | 81.8 | 0.10 | 0 | 0.1 | 37.9 | 5210 | +4.2 |
| 3 | 18.2 | 81.8 | 0.15 | 0 | 0.1 | 37.8 | 6200 | +5.3 |
| 4 | 18.2 | 81.8 | 0.18 | 0 | 0.1 | 37.8 | 4800 | +5.6 |
| 5* | 18.2 | 81.8 | 0.20 | 0 | 0.1 | 38.1 | 3100 | +4.1 |
| 6* | 18.2 | 81.8 | 0.10 | 0 | 0.5 | 36.6 | 2200 | +1.9 |
| 7 | 23.0 | 77.0 | 0.10 | 0 | 0.1 | 39.5 | 4300 | +16 |
| 8* | 30.0 | 70.0 | 0.10 | 0 | 0.1 | 85.2 | 3000 | +8.1 |
| 9 | 15.0 | 85.0 | 0.10 | 0 | 0.1 | 41.5 | 5100 | +28 |
| 10* | 12.0 | 88.0 | 0.10 | 0 | 0.1 | 66.2 | 3100 | +74 |
| 11 | 18.2 | 81.8 | 0.05 | 0.1 | 0.1 | 38.1 | 4890 | +5.1 |
| 12 | 18.2 | 81.8 | 0.10 | 0.1 | 0.1 | 37.7 | 5100 | +5.2 |
| 13* | 18.2 | 81.8 | 0.20 | 0.1 | 0.1 | 37.6 | 3310 | +5.1 |
| 14 | 18.2 | 81.8 | 0.05 | 0.5 | 0.1 | 38.0 | 5480 | +4.1 |
| 15 | 18.2 | 81.8 | 0.10 | 0.5 | 0.1 | 38.2 | 7310 | +4.0 |
| 16* | 18.2 | 81.8 | 0.20 | 0.5 | 0.1 | 38.1 | 3020 | +3.8 |
| 17 | 18.2 | 81.8 | 0.05 | 1.0 | 0.1 | 38.2 | 6310 | +3.7 |
| 18 | 18.2 | 81.8 | 0.10 | 1.0 | 0.1 | 37.9 | 9150 | +4.1 |
| 19* | 18.2 | 81.8 | 0.20 | 1.0 | 0.1 | 38.1 | 3730 | +4.4 |
| 20 | 18.2 | 81.8 | 0.05 | 1.2 | 0.1 | 38.4 | 6530 | +3.6 |
| 21 | 18.2 | 81.8 | 0.10 | 1.2 | 0.1 | 38.2 | 7930 | +4.1 |
| 22* | 18.2 | 81.8 | 0.20 | 1.2 | 0.1 | 38.3 | 3160 | +4.0 |
| 23* | 18.2 | 81.8 | 0.05 | 1.5 | 0.1 | 38.6 | 3120 | +3.6 |
| 24* | 18.2 | 81.8 | 0.10 | 1.5 | 0.1 | 38.2 | 3150 | +4.1 |
| 25* | 18.2 | 81.8 | 0.20 | 1.5 | 0.1 | 37.8 | 2830 | +4.2 |
| 26 | 23.0 | 77.0 | 0.10 | 1.0 | 0.1 | 39.5 | 4300 | +16 |
| 27* | 30.0 | 70.0 | 0.10 | 1.0 | 0.1 | 85.2 | 800 | — |
| 28 | 15.0 | 85.0 | 0.10 | 1.0 | 0.1 | 40.6 | 5290 | +26 |
| 29* | 12.0 | 88.0 | 0.10 | 1.0 | 0.1 | 64.3 | 3100 | +66 |
| 30 | 18.2 | 81.8 | 0.10 | 1.0 | 0.05 | 38.2 | 6200 | +4.2 |
| 31 | 18.2 | 81.8 | 0.10 | 1.0 | 0.2 | 38.1 | 7100 | +4.8 |
| 32* | 18.2 | 81.8 | 0.10 | 1.0 | 0.5 | 38.2 | 2800 | +5.1 |
| 33 | 18.2 | 81.8 | 0.10 | 0.05 | 0.1 | 38.1 | 5350 | +4.2 |
| 34 | 18.2 | 81.8 | 0.10 | 1.0 | 0.1 | 38.3 | 9200 | +3.6 |
| 35* | 18.2 | 81.8 | 0.10 | 1.5 | 0.1 | 38.5 | 2910 | +5.3 |
| 36 | 18.2 | 81.8 | 0.10 | 0.05 | 0.1 | 38.1 | 5350 | +4.2 |
| 37 | 18.2 | 81.8 | 0.10 | 1.0 | 0.1 | 38.6 | 9050 | +3.5 |
| 38* | 18.2 | 81.8 | 0.10 | 1.5 | 0.1 | 38.5 | 2910 | +5.3 |
| 39 | 18.2 | 81.8 | 0.10 | 0.05 | 0.1 | 38.3 | 5930 | +5.2 |
| 40 | 18.2 | 81.8 | 0.10 | 1.0 | 0.1 | 38.0 | 8930 | +3.0 |
| 41* | 18.2 | 81.8 | 0.10 | 1.5 | 0.1 | 38.5 | 2050 | +4.8 |

*Comparative sample
**X = Ba(Ni$_\frac{1}{3}$Ta$_\frac{2}{3}$)O$_3$
***Y = La$_2$O$_3$ for Samples Nos. 11–32
Fe$_2$O$_3$ for Samples Nos. 33–35
Sb$_2$O$_3$ for Samples Nos. 36–38
Ta$_2$O$_5$ for Samples Nos. 39–41

What is claimed is:

1. A dielectric composition consisting essentially of a mixture of 15–25 mol % of BaO and 85–75 mol % of TiO$_2$, and an effective amount of Ba(Ni$_\frac{1}{3}$Ta$_\frac{2}{3}$)O$_3$ of more than zero and less than 0.2% based on the weight of the mixture.

2. A dielectric composition consisting essentially of a mixture of 15–25 mol % of BaO and 85–75 mol % of TiO$_2$, an effective amount of Ba(Ni$_\frac{1}{3}$Ta$_\frac{2}{3}$)O$_3$ of more than zero and less than 0.2%, and MnO$_2$ in an amount of up to 0.4% based on the weight of said mixture.

3. A dielectric composition consisting essentially of a mixture of 15–25 mol % of BaO and 85–75 mol % of TiO$_2$, an effective amount of Ba(Ni$_\frac{1}{3}$Ta$_\frac{2}{3}$)O$_3$ of more than zero and less than 0.2%, and at least one metal oxide selected from the group consisting of La$_2$O$_3$, Sb$_2$O$_3$, Fe$_2$O$_3$ and Ta$_2$O$_5$ in an amount of 0.1–1.2% based on the weight of said mixture.

4. A dielectric composition consisting essentially of a mixture of 15–25 mol % of BaO and 85–75 mol % of TiO$_2$, an effective amount of Ba(Ni$_\frac{1}{3}$Ta$_\frac{2}{3}$)O$_3$ of more than zero and less than 0.2%, at least one metal oxide selected from the group consisting of La$_2$O$_3$, Sb$_2$O$_3$, Fe$_2$O$_3$ and Ta$_2$O$_5$ in an amount of 0.1–1.2%, and MnO$_2$ in an amount of up to 0.4% based on the weight of said mixture.

* * * * *